June 24, 1969

H. C. HAAS 3,451,926

SOLVENT EXTRACTION PROCESS

Filed March 30, 1967

---

PLACE A HYDRATABLE CROSS-LINKED NITROGENOUS POLYMERIC MATERIAL WHICH IS CHARACTERIZED BY TEMPERATURE-INVERTING PROPERTIES WITH RESPECT TO ITS SWELLABILITY IN WATER AND WHICH CONTAINS, AS FUNCTIONAL GROUPS, ONLY THOSE WHICH ARE DEVOID OF OXYGEN, IN CONTACT WITH AN AQUEOUS SOLUTION WHICH IS MAINTAINED AT A TEMPERATURE BELOW THE DEHYDRATION TEMPERATURE OF THE POLYMERIC MATERIAL.

↓

REMOVE THE HYDRATED POLYMERIC MATERIAL FROM CONTACT WITH AQUEOUS SOLUTION.

↓

DEHYDRATE THE POLYMERIC MATERIAL BY USING THERMAL OR COMPRESSIVE ENERGY.

---

INVENTOR.
Howard C. Haas

BY   Brown and Mikulka
     and
     Sheldon W. Rothstein

ATTORNEYS

United States Patent Office 3,451,926
Patented June 24, 1969

3,451,926
SOLVENT EXTRACTION PROCESS
Howard C. Haas, Arlington, Mass., assignor to Polaroid Corporation, Cambridge, Mass., a corporation of Delaware
Filed Mar. 30, 1967, Ser. No. 627,016
Int. Cl. C02b 3/06, 1/18
U.S. Cl. 210—59                                    4 Claims

ABSTRACT OF THE DISCLOSURE

Pure water may be removed from an aqueous solution containing dissolved inorganic salts by contacting the solution with a solid cross-linked nitrogenous polymeric material containing both hydrophilic and hydrophobic moieties and characterized by inverse temperature swellability properties with respect to water at a temperature at which said material becomes hydrated; removing said polymeric material from said solution; and dehydrating said polymeric material.

---

This invention relates to a novel method for separating a solvent from an aqueous solution, and more particularly, relates to the recovery of substantially demineralized water from sea water or other aqueous solutions containing various levels of dissolved inorganic salts.

Though more than two-thirds of the earth's surface is covered with water, most of it is briny and the shortage of pure water has become a persistent problem throughout the world. Progress is, of course, being made toward recovering pure water from the sea, but most of the techniques known today, though workable, are much too expensive to be considered on a large-scale basis.

Methods for removing solvents from solutions are well known. In most instances of commercial solvent extraction, however, the value of the recovered constituent usually is great enough to justify the expense of operating the process. Unfortunately, this is not the case when considering large-scale desalination of sea water since, by present standards, water is quite inexpensive, and even by the most conservative estimates, large scale desalinization of sea water which would provide sufficient water for human and agricultural uses would render the largest industrial solvent extraction processes miniscule by comparison.

The separation of water from aqueous salt solutions requires the addition of energy, usually supplied as either heat or work. Different practical separation processes use different amounts of energy, but the second law of thermodynamics provides a basis for the calculation of the absolute minimum energy required by any process, including those yet to be invented. This minimum is 2.5 to 3.0 kw. hr. to remove 1,000 gallons of water from a very large quantity of sea water at 20° C.; for most brackish water it is considerably less.

A solution, such as saline water, can be separated into its constituents if means can be provided to establish regions that differ in concentration. Therefore, if the salts in sea water can be distributed between two parts of the solution, let us say one five percent and one two percent salt, a major step toward complete separation of water and salt will have been accomplished.

In order to effect separation, it is necessary to physically remove the regions of different concentrations, which is an extraordinarily difficult task if both are part of the same phase. One practical approach to this problem, therefore, is to design a process which requires that the two regions be in two phases since these can usually be separated with very little difficulty. The necessary difference in concentration between the two regions can result either from a concentration difference at equilibrium, or from a difference in rates of transfer of the constituents of the solution from the system.

Some separation processes employ membranes that are relatively more permeable to either salts or water. If sea water and pure water, both at the same pressure, are separated by a membrane, the concentrations of the two liquids tend to equalize by passage through the membrane of salt or water or both. If the membrane used is more permeable to water than salt, the pure water will dilute the salt water. However, if the pressure on the salt water side is increased sufficiently, water will pass from the solution to the fresh water side at an appreciable rate. The energy required for this separation process, termed a "reverse-osmosis" process, is supplied to the pump which delivers the salt solution to the high pressure side of the membrane.

Separation of water from a salt solution by boiling appears to be an entirely different process, but actually consists of the same fundamental elements. Two regions, liquid and vapor, are established with quite different compositions, and then separated mechanically. A potential, in the form of heat applied, is needed to attain an equilibrium condition between phases. Superheat, applied to the boiling solution, provides the potential necessary to cause transport of water from the liquid to the vapor phase. The phase boundary permitting more rapid transport of water than of salt.

In a practical separation process, the energy required is related to the potentials causing transport of the extracted constituent from the solution. System inefficiencies are based upon the difference between the actual potential required for transport of the desired constituent, and the potentials needed to supply energy to the system to produce the desired product. Losses are encountered due to mechanical and fluid friction, mixing of fluids not at equilibrium, heat loss to the surroundings, etc. However, the greatest inefficiencies in most separation processes arise largely from the transport of energy or matter at phase boundaries. For example, in reverse osmosis, the separation process is not efficient since very large pressures above equilibrium pressure are needed to obtain satisfactory transport rates. Moreover, high transport rates will cause concentration gradients in the liquid near the membrane. These gradients tend to oppose the process and introduce additional inefficiencies. Similar inefficiencies are found in other membrane processes, including electrodialysis and other processes where salts migrate in an electric field. In boiling, transport from liquid to vapor is effected by negligible potential and the separation process itself is highly efficient. Large losses are introduced, however, by the temperature differences required to supply the needed energy by heat transfer to the system across its boundaries, and this problem is accentuated by the formation of scale. Freezing methods also encounter heat transfer problems, and serious difficulties arise at the liquid-solid interface, both in crystal growth and in washing out the brine.

Processes such as those mentioned above are considered to be unacceptable for use in large scale desalination because of the inordinately high energy requirements which results in a high cost per unit product. Since most of the processes require the input of large amounts of energy to the feed before any separation occurs, it is evident that a system which depends only on the input of energy to the desired product (and, in this case, a sorptive medium) can be made many times more economical than the above-mentioned systems, particularly in view of the fact that the product, i.e., de-ionized water, usually constitutes only a small fraction of the feed. The present invention provides such a means for separating substantially pure water from an aqueous solution by an economically attractive method which may be operated at a lower cost than the methods of the prior art due to the removal of a major proportion of the feed solution (the non-sorbed phase) prior to the input of energy to the system.

The primary object of the present invention is, therefore, to provide a novel method for economically extracting water from aqueous solutions.

A further object of the present invention is to provide a method for the removal of water from an aqueous solution containing dissolved inorganic salts by the utilization, as a selective sorbent, of crosslinked nitrogenous polymers which are devoid of functional oxygen and which demonstrate inverse temperature swellability characteristics with respect to water.

Still another object of the present invention is to prepare a synthetic polymeric composition which is capable of forming hydrates thereof in aqueous solution and which, in its hydrated form, is capable of releasing its water of hydration by the input of energy to return it to its non-hydrated form.

Yet another object of the present invention is to provide a process for economically removing water from an aqueous solution on a continuous basis with no energy expended on the enriched feed solution (non-sorbed phase) which is to be discarded.

Another object of the present invention is the separation of potable water from a water solution using the inverse temperature swellability characteristics of a certain class of nitrogenous crosslinked polymers, with substantially no loss in polymer throughout the entire separation procedure.

Other objects of the invention will in part be obvious and will in part appear hereinafter.

It is envisioned that the polymer utilized in the instant process will be indefinitely reusable for the intended purpose and will require replacement only when, and if, its attitude or configuration is altered to such an extent that it is, in a mechanical sense, no longer operating efficiently in the embodiment utilized.

The invention accordingly comprises the method involving the several steps and the relation of and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a flow diagram of the steps required to practice the process of the instant invention.

By this invention, an appreciable advancement has been achieved toward mastering the cost problem of desalination of sea water. Wholly unexpectedly it has been found that when a certain class of crosslinked nitrogenous polymers is brought into contact with a water solution, the water solvent is sorbed so that the solute concentration in the remaining solution, at equilibrium, becomes greater than the solute concentration in the sorbed phase.

As will be evident from the flow diagram and the discussion below, the process of the instant invention may be operated as a one-pass system, or a multiple pass system, depending upon the extraction efficiency per pass. The extraction efficiency is measured in terms of the partition coefficient of the polymer system used, which is defined as the equilibrium ratio of the concentration of the inorganic salt material in the non-sorbed phase to the concentration of the inorganic salt material in the solution which has been sorbed by the polymer. As a practical matter, a partition coefficient preferably above 15 is desirable if the expected extraction product, potable water, is to be obtained in two passes; more passes being required for polymers having lower partition coefficients to achieve a low degree of salinity. For a one pass process, a partition coefficient preferably above 100 is desirable.

The polymers useful in practicing the process of the instant invention are those polymers which display temperature-inverting characteristics with regard to solubility in water before they are insolubilized by crosslinking, i.e., as the temperature of the environment increases, the ability of the polymer to dissolve in water decreases. It naturally follows, therefore, that as the environmental temperature is lowered the polymer's solubility in water will increase.

The temperature-inverting characteristics of this class of polymers probably is achieved by having proportionate amounts of hydrophilic and hydrophobic groups attached to the polymer molecule, the hydrophilic groups being potential bonders with the hydrogen of the water. The ratio of hydrophilic to hydrophobic groups in the molecule should determine the precipitation temperature of the uncrosslinked polymer system.

As pointed out above, it is beneficial for separation purposes to have defined zones of different concentration in separate phases in the solution to which the separation process is applied. Accordingly, it is considered critical to this invention that the polymeric material used be in the solid phase. This is accomplished by crosslinking the polymer or copolymer with appropriate crosslinking agents so that a lattice-like high molecular weight polymeric structure is formed. This structure is no longer soluble in water but its inherent temperature-inverting solubility properties may be taken advantage of since they are directly related to the swellability of the crosslinked polymeric material. The polymer may be in the form of a film, beads, etc., or any other configuration which may be easily handled and utilized in the process of the instant invention.

The crosslinked polymeric materials useful in this invention are swellable as a function of the solvatability of their hydrophilic groups in water. As the temperature of the environment is raised, hydrogen bonding, or water-polymer interaction, is discouraged. The free energy of swelling becomes less negative with increased environmental temperature and results in decreased solvatability of the hydrophilic portion of the polymer molecules with concomitant decreased swelling of the crosslinking structure.

Practically speaking, then, this invention recognizes:

(a) that water may be removed from an aqueous solution of inorganic salts by being sorbed from the solution by a certain class of nitrogenous temperature-inverting crosslinked polymers; and (b) that certain nitrogenous, hydratable, temperature-inverting polymers may be used for extracting water from aqueous solutions of inorganic salts thereby eliminating the need for applying thermal energy to the input solution; dehydration of the polymer being accomplished after the swollen polymeric structure is removed from the aqueous solution.

While heating the water-gorged polymeric system is considered to be the best way of extracting the sorbed water, it is by no means the only method by which this may be accomplished. Mechanical means such as squeezing, pressing, centrifuging, etc. have met with success and eliminate the need for supplying the system with thermal energy of any type.

Patent No. 3,234,125, issued on Feb. 8, 1966, is drawn to a process of extracting de-ionized water from a saline solution by a hydration mechanism utilizing polymers with temperature-inverting solubility characteristics. However, a critical limitation of the process of that patent is that the polymeric composition utilized must contain multiple oxygen bearing functional groups and from about two to eight hydrocarbon units selected from the class consisting of methyl, methylene, and methylidyne per oxygen bearing group. That patent, in fact, teaches away from the use of polymeric systems which are devoid of functional oxygen groups.

It has unexpectedly been found by the applicant herein that polymeric, nitrogenous temperature-inverting compounds may be used to de-ionize water These compounds useful for this purpose should at least be devoid of functional oxygen atoms. The term "functional oxygen atoms" refers to those oxygen atoms in the polymer molecule which are intimately associated with, and appreciably effect the solvation of the uncrosslinked polymeric material in water at a temperature below the precipitation temperature of the polymer by forming complexes with the hydrogen of the water molecules.

The primary embodiment of the present invention relates to a process for separating water from an aqueous solution which comprises contacting said solution with a crosslinked film of a synthetic nitrogenous polymeric temperature-inverting material which is devoid of functional oxygen atoms, while said solution is at a temperature below the precipitation temperature of the uncrosslinked polymer, wherein said polymeric material forms a hydrate with only the water component of said solution; removing the resultant hydrated swollen film from said solution; and exposing it to sufficient thermal or mechanical energy to cause the swollen film to give up its water of hydration. In cases where the aqueous solution also contains organic solvents the present process is limited to the situation wherein said organic solvents are soluble in water and said polymeric material is insoluble in said organic solvents.

It has been found that if extremely low molecular weight polymers are used, the crosslinked polymeric compositions of the present invention may disrupt and have very little utility for its intended purpose. Ideally, the polymer should remain intact throughout the entire operating temperature range of the instant process from the formation of the polymer hydrate at a low temperature to the release of water of hydration at a relatively high temperature. Polymers of molecular weights above 10,000 are perfered, the best range being above 50,000.

The hydrate-forming polymer, although operable in the form of beads, spheres, particles, etc. is preferably cast on a porous, structurally rigid support which should consist of inert materials and have rather low specific heats. The support should provide the function of extending the physical spacial influence of the polymer thereby increasing total surface area per unit of polymer.

The precise mechanism which determines whether or not a polymeric material will display temperature-inverting properties is not known. However, in order to tailor or modify polymers to be operative within the desired temperature range a theory as to the cause of temperature inversion had to be evolved.

In all probability the uncrosslinked polymer goes into solution with water by a hydrogen bonding mechanism. Since hydrogen bonds are rather weak it is probable that an input of thermal energy to the system might be sufficient to cause the cleavage of such bonds, at which point the polymer should precipitate from the solution. It is further theorized that the point at which the hydrated, swollen crosslinked polymer will give up its water of hydration can be predetermined by judiciously balancing the ratio of hydrophiles to hydrophobes in the polymer molecule since the hydrophilic moiety would enhance polymer swellability and the hydrophobic moiety could be used to determine the dehydration point of the polymer. Swelling, with reference to the crosslinked polymer, is synonymous with solubility of the uncrosslinked polymer, and the temperature-swell characteristics of the crosslinked polymer would generally be consonant with the temperature-solubility characteristics of the uncrosslinked polymer.

In order to form polymers which may be used in the process of the instant invention, varying amounts of nitrogenous monomers which are devoid of functional oxygen-containing groups, and whose polymers display hydrophilicity may be copolymerized with predetermined amounts of monomers whose polymers display hydrophobicity, to achieve the desired deswelling point. Monomers of interest which are useful in making copolymers or terpolymers with the necessary hydrophobic-hydrophilic balance include; acrylonitrile; vinyl quinolines; 2-vinyl pyridine; 3-vinyl pyridine; 4-vinyl pyridine; 2-isopropyl-N-vinyl imidazole; syrene; alkyl bromide quaternary salts of 2-, 3-, and 4-vinyl pyridine; 2-methyl-N-vinyl-imidazole; 2-ethyl-N-vinyl-imidazole; ethylene imine; N-alkylated ethylene imines; N-vinyl pyrole; N-vinyl indole; N-vinyl pyrazole; N-vinyl 1,2,4 triazole; isopropenyl pyridines; 5-vinyl pyrazoline; 3-vinyl piperidine, etc.

Also useful in the present invention are homopolymers wherein various moieties present in the monomer lend varying degrees of hydrophilicity and hydrophobicity to the polymer, such as homopolymers of N-alkylated ethylene imines, poly-2-ethyl-N-vinyl imidazole, etc.

In order to form appropriate covalently crosslinked films, various techniques may be used depending on the monomers or polymers in question.

Methods include:

(1) Irradiating a film with an electron beam or high energy radiation.

(2) Cast into the film materials that generate free radicals upon heating and crosslink by applying thermal energy.

(3) Prepare film originally by polymerizing together the appropriate monomers and an appropriate difunctional monomer.

(4) Crosslink polymers containing reactive functional groups by the addition of appropriate crosslinking agents to the casting solution.

In has been found that by controlling the percentage of water sorption of the polymeric water-sorbing film, its partition coefficient may be altered. As the percent sorption is reduced the partitioning efficiency increases and asympotically approaches infinity which, on a practical basis, cannot be achieved. The system must therefore be optimized so that a satisfactory partition coefficient is achieved utilizing a reasonable percentage polymeric swell in order to maintain as efficient a process as possible.

The following example is given by way of illustration and not limitation of the scope of the instant invention.

EXAMPLE

Poly (N-vinyl-2-ethyl-imidazole) was prepared by polymerizing N-vinyl-2-ethyl imidazole in benzene at 70° C. with one percent azobisisobutyronitrile as a catalyst. The polymer was found to be soluble in water at temperatures below 20° C. When the temperature was raised to 20° C. the polymer precipitated out of solution.

Films of poly (N-vinyl-2-ethyl imidazole) were crosslinked in situ with 5 mole percent of $\alpha,\alpha^1$, dibromo-p-xylene on nylon screening. The films were immersed in a 3.5% sodium chloride solution at 15° C. and the system was allowed to equilibrate for 4½ days. The films were found to have swollen approximately 170%. Through the use of carefully controlled conductivity measurements the partition coefficient of the system was calculated to be 1.50.

Other experimentation and extrapolation of partition coefficients at various degrees of swelling indicate that the partition coefficient approaches infinity as the degree of swelling approaches zero.

Since certain changes may be made in the above process and apparatus without departing from the invention herein involved, it is intended that all matter contained in the above description or shown in the accompanying drawing shall be interpreted as illustrative and not in a limiting sense.

What is claimed is:
1. The method of removing water from an aqueous solution containing dissolved inorganic salts which comprises:
   (a) contacting said solution with a solid, crosslinked, nitrogenous polymeric material having both hydrophilic and hydrophobic moieties in each polymer molecule, said polymer being characterized by inverse temperature swellability properties with respect to water and containing, as functional groups, only those which are devoid of oxygen, at a temperature at which said solid polymeric material becomes hydrated;
   (b) removing said solid polymeric material from contact with said solution; and
   (c) dehydrating said solid polymeric material.
2. The invention of claim 1 wherein said hydrated polymeric material is dehydrated by the application of compressive pressure.
3. The invention of claim 1 wherein said hydrated polymeric material is dehydrated by the application of thermal energy.
4. The invention of claim 3 wherein said polymeric material is poly (N-vinyl-2-ethyl imidazole) crosslinked with $\alpha,\alpha^1$, dibromo-p-xylene.

References Cited

UNITED STATES PATENTS

| 2,984,623 | 5/1961 | Lee | 210—500 X |
| 3,083,118 | 3/1963 | Bridgeford | 117—47 |
| 3,234,125 | 2/1966 | Bloch | 210—59 |
| 3,234,126 | 2/1966 | Bloch | 210—59 |
| 3,386,912 | 6/1968 | Lazare | 210—22 |
| 3,386,913 | 6/1968 | Lazare | 210—22 |

OTHER REFERENCES

Desalination Research and The Water Problem, Report of the Desalination Research Conference Convened by the National Academy of Sciences, National Research Council at Woods Hole, Mass. June 19-July 14, 1961, received in Patent Office July 27, 1962.

Publication 941 of the National Academy of Sciences, National Research Council, Washington, D.C., 85 pp. 57 and 72 relied on.

REUBEN FRIEDMAN, *Primary Examiner.*

FRANK A. SPEAR, JR., *Assistant Examiner.*